April 5, 1932.  J. J. MANDERSCHEID  1,852,354
WHEEL DRESSER
Filed April 25, 1931
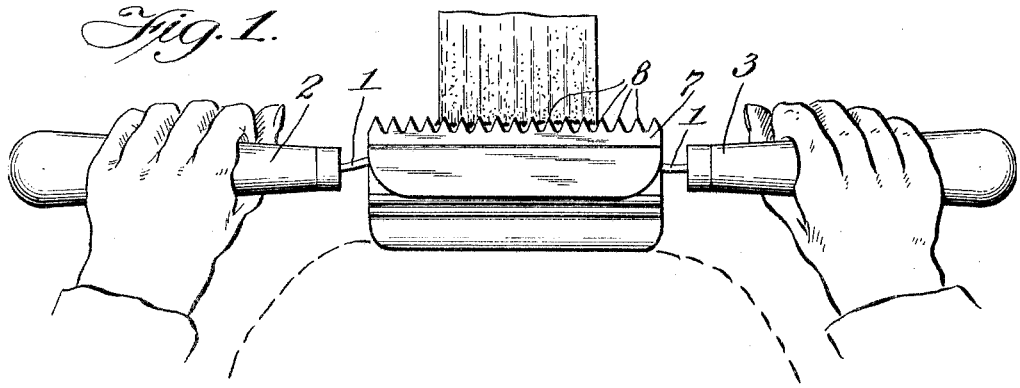
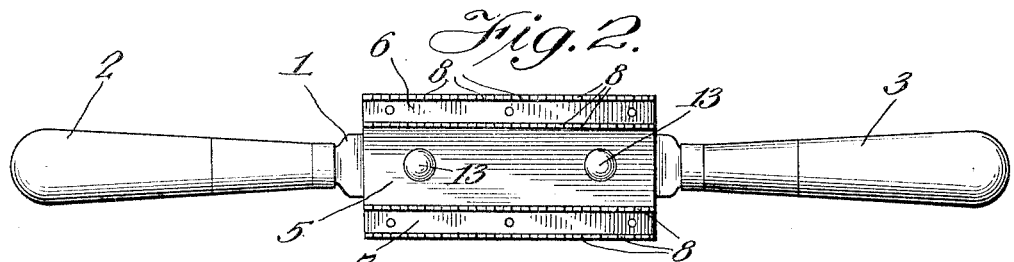
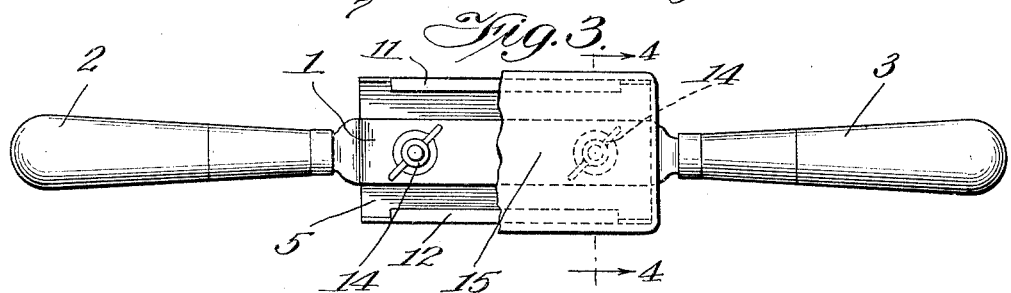
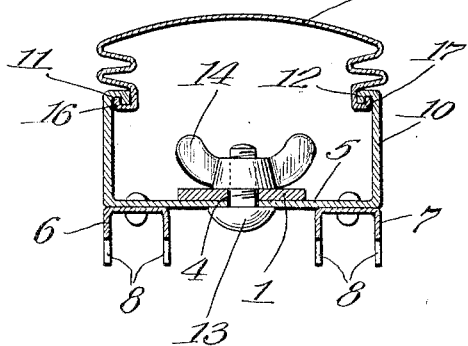
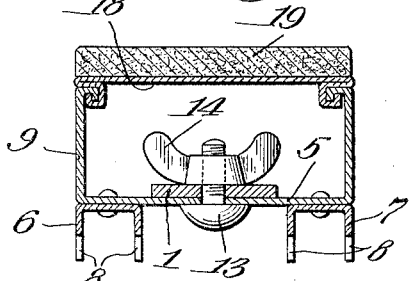
Inventor
James J. Manderscheid.
By Mason, Fenwick & Lawrence
Attys.

Patented Apr. 5, 1932

1,852,354

UNITED STATES PATENT OFFICE

JAMES J. MANDERSCHEID, OF CHICAGO, ILLINOIS

WHEEL DRESSER

Application filed April 25, 1931. Serial No. 532,943.

This invention relates to wheel dressers for buffing or polishing wheels and has for its general object the provision of a device adapted to be applied peripherally to the wheel for freeing the latter from polishing paste, etc., removing the glossy surface which may have formed on the wheel and resurfacing the wheel and restoring it to its original efficiency.

A more specific object of the invention is the provision of a wheel dresser, the surface engaging elements of which are removable and may be replaced from time to time.

Another object of the invention is the provision of a device of the class described in which a removable back plate of resilient nature is provided whereby the wheel dresser may be pressed into intimate contact with the wheel being treated, by the abdomen of the operator.

Still another object of the invention is to provide a support including the lateral handles and a removable frame including the surface engaging elements, removably securable to said support, and a removable resilient backing for said frame constituting therewith a housing for enclosing and concealing the means by which the frame with its appurtenant surface engaging elements is secured to the device.

Other objects of the invention will appear as the following description of a preferred and practical embodiment thereof proceeds.

In the drawings in which the same characters of reference have been used throughout the several figures to designate identical parts:

Figure 1 is a plan view of the wheel dresser, the abdomen of the operator being indicated in broken lines;

Figure 2 is a front elevation showing the surface engaging means;

Figure 3 is a rear elevation part of the resilient backing being broken away to show the securing means;

Figure 4 is a cross section taken along the lines 4—4 of Figure 3; and

Figure 5 is a similar cross section through a modified form of the invention.

Referring now in detail to the several figures, and first adverting to that form of the invention shown in the first four figures, the numeral 1 represents a bar having lateral handles 2 and 3 at its opposite ends. The bar is perforated, preferably at spaced points, one of which is indicated at 4 in Figure 4. A frame 5 is provided to which are riveted or otherwise suitably secured channel members 6 and 7 extending parallel to the bar 1, said channel members each having a free edge in the form of a saw that is to say, provided with teeth 8. The several rows of teeth preferably terminate in the same plane.

The frame 5 is channel shaped, formed by angular flanges 9 and 10 which at their tops are angularly bent so as to form guiding grooves 11 and 12. The frame is provided with perforations registering with the perforations in the bar 1, bolts 13 being introduced through the registering apertures and cooperating with wing nuts 14 for removably securing the frame 5 to the bar 1.

A removable backing 15 is provided which is of general channel shape as shown in Figure 4 and bent at its free edges as shown at 16 and 17 so as to enter and slidably cooperate with the guiding grooves 11 and 12. The side flanges of the backing 15 are sinuous in cross section whereby the backing is rendered highly resilient or shock absorbing.

It will be understood particularly from Figures 3 and 4, that when the backing is in place the wing nuts 14 are concealed in the housing constituted by the frame 5 and said backing, and that in order to loosen the wing nuts for removing or replacing the frame 5 with the surface engaging elements, it is necessary to slide the backing 15 out of the way.

In the use of the device, it is held against the periphery of the buffing or polishing wheel which is preferably of the type constructed of fabric, felt or leather; and the wheel is permitted to rotate against the teeth 8. A detergent action thus takes place which frees the periphery of the wheel of its glossy surface or any surplus or encrusted polishing paste. Additional pressure is brought to bear upon the device while it is against the wheel, by pressing the abdomen against the backing 15. The vibration communicated to the wheel dresser by the rotation of the wheel is absorbed by the resilient features of the backing 15 and not communicated to the abdomen of the user.

A modified form of the invention is shown in Figure 5 in which the construction is similar to that described in connection with the first form of the invention except that instead of all metal resilient backing 15, there is provided a backing 18 furnished with a cushion pad 19 adapted to be engaged by the abdomen of the user.

The number of channeled members 6 and 7 is immaterial to the invention as is also the numbers of rows of teeth. It is to be understood also that numerous variations in the details of construction may be practiced without violating the spirit or scope of the invention, and that the specific form as shown is merely illustrative and not to be considered limitative in its effect upon the breadth of the appended claims.

What I claim is:

1. A wheel dresser comprising an abrading element, lateral handles between which said element is supported, and a yielding backing for said abrading element, adapted to transmit pressure thereto from the body of the operator.

2. A wheel dresser comprising a support having lateral handles, a frame removably secured to said support, said frame including rows of teeth for engaging the wheel to be dressed, and a yielding backing for said frame adapted to transmit pressure thereto from the body of the operator.

3. A wheel dresser comprising a support having lateral handles, a frame removably carried by said support, channel members fixed to said frame having their flanges extending parallel and in the same direction, said flanges being formed with teeth.

4. A wheel dresser comprising a support having lateral handles, a frame, means for removably securing said frame to said support, and a yielding backing slidable with respect to said frame and housing said securing means.

5. A wheel dresser comprising a support having lateral handles, a channel shaped frame, means for removably securing said frame to said support, abrading means on one side of said frame for engaging the surface of the wheel to be dressed, and a backing for said frame normally engaging the flanges thereof and forming a housing enclosing said securing means.

6. A wheel dresser as claimed in claim 5, the backing being resilient.

7. A wheel dresser as claimed in claim 5, the backing being resilient and slidable with respect to said frame.

8. A wheel dresser as claimed in claim 5 including a channel shaped backing having the sides of the channels thereof sinuous in cross section to provide resiliency, said backing being slidable with respect to said frame.

In testimony whereof I affix my signature.

JAMES J. MANDERSCHEID.